No. 755,663. PATENTED MAR. 29, 1904.
J. E. HILL.
FISH MOUTH OPENER.
APPLICATION FILED JULY 30, 1903.
NO MODEL.
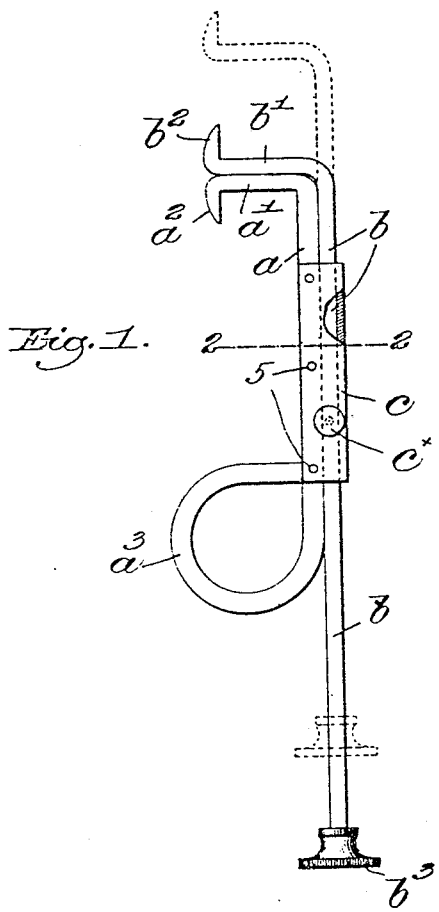
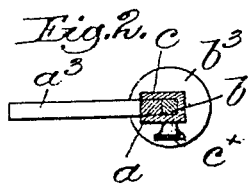
Witnesses:
Fred S. Greenhof
S. Wm. Sutton
Inventor.
John E. Hill.
By Crosby Gregory
Attys.

No. 755,663. Patented March 29, 1904.

UNITED STATES PATENT OFFICE.

JOHN E. HILL, OF CENTER HARBOR, NEW HAMPSHIRE.

FISH-MOUTH OPENER.

SPECIFICATION forming part of Letters Patent No. 755,663, dated March 29, 1904.

Application filed July 30, 1903. Serial No. 167,524. (No model.)

*To all whom it may concern:*

Be it known that I, JOHN E. HILL, a citizen of the United States, and a resident of Center Harbor, county of Belknap, State of New Hampshire, have invented an Improvement in Fish-Mouth Openers, of which the following description, in connection with the accompanying drawings, is a specification, like characters on the drawings representing like parts.

This invention has for its object the production of a simple and effective device for opening the mouth of a fish to enable the fisherman to extract the hook.

Sometimes when the fish swallows the hook or when it is firmly caught in the mouth or adjacent parts it is very difficult to extract the hook, and frequently the line must be cut. In extracting the hook from fish whose mouths are provided with sharp teeth the fingers and hands of the fisherman are frequently injured thereby. By the use of my invention, which is of small compass and can be carried readily in the pocket, the mouth of the fish is held open, permitting the free use of the hands in extracting the hook, and absolutely preventing any danger from bites.

The novel features of my invention will be described hereinafter and particularly pointed out in the following claims.

Figure 1 is a side elevation, partly broken out, of a fish-mouth opener embodying one form of my invention; and Fig. 2 is a cross-sectional detail thereof on the line 2 2, Fig. 1, looking down.

In the present embodiment of my invention the device comprises two members, each provided with a jaw and slidable longitudinally the one relatively to the other, and means to hold said members from such relative movement, each member comprising an elongated straight jaw-carrier and a laterally-extended jaw. Referring to Fig. 1, one of the members consists of a straight jaw-carrier or shank $a$, preferably rectangular in cross-section and bent at right angles at one end to form a laterally-extended jaw $a'$, preferably provided with a downturned prong $a^2$. At its opposite end the jaw-carrier is bent to form a ring $a^3$ of a size suitable to easily receive the finger of the operator. The other member comprises a longer straight shank or jaw-carrier $b$, bent at right angles at one end to form a jaw $b'$, which overhangs the jaw $a'$, and an upturned prong $b^2$ is preferably formed on the said jaw $b'$. The two jaw-carriers are superposed to slide longitudinally one upon the other to close or open the jaws, as will be obvious.

An elongated box-like guide $c$ is shown as rigidly secured to the jaw-carrier $a$ in any suitable manner, as by rivets 5, the other jaw-carrier $b$ sliding in the guide and being retained by it in operative position. The jaw-carrier $b$ at its end opposite the jaw is provided with an enlarged head or thumb-piece $b^3$, Fig. 1, and a clamp-screw $c^x$ is mounted on the guide to coöperate with the jaw-carrier $b$, the latter being held from movement when the clamp-screw is set up.

The device will be made of stout metal, preferably nickeled or otherwise treated to prevent rusting or corrosion, and by reference to Fig. 2 it will be seen that it is substantially flat and can be carried conveniently in the pocket when not in use. Its normal condition is illustrated in full lines, Fig. 1, and when it is desired to use it the operator inserts the closed jaws in the mouth of the fish, turns the device to bring the prongs $b^2$ and $a^2$ in position to engage the top and bottom of the mouth, and then by pressing with his thumb against the thumb-piece $b^3$ opens the jaws, the forefinger at such time being inserted in the ring $a^3$. When the desired jaw-opening is effected, the clamp-screw $c^x$ is set up, holding the jaws in open position, and then the operator has the free use of his hands and fingers in removing the fish-hook. After such removal the clamp-screw is loosened, the jaws closed, and the device removed from the mouth of the fish.

By making the jaw-carriers or shanks rectangular in cross-section they cannot turn one upon the other to displace the jaws, the guide $c$ forming the connection between the two members of the device.

Inasmuch as the mouth of the fish is held open by the device described, it is impossible for the fisherman to be bitten or to have his fingers torn by the teeth of the fish.

I prefer to provide the jaws with the prong as $a^2 b^2$, to prevent the device from slipping when in use.

Having fully described my invention, what I claim as new, and desire to secure by Letters Patent, is—

1. In a device of the class described, two oppositely-movable jaws, an elongated jaw-carrier for each, said jaw-carriers being in parallelism and slidable longitudinally upon and relatively to each other, a long box-like guide for one jaw-carrier, rigidly mounted upon the other, and means to clamp the jaw-carriers from relative movement.

2. In a device of the class described, two elongated and parallel jaw-carriers having plane, opposed faces, one jaw-carrier being slidably mounted upon and movable longitudinally relatively to the other, the adjacent ends thereof being bent at right angles to form parallel jaws, a prong on each jaw, said prongs pointing in opposite directions, a guide on one jaw-carrier slidably embracing the other and a clamp-screw to prevent relative movement of the jaws when set.

3. In a device of the class described, two L-shaped members having their longer arms superposed one upon the other and their shorter arms movable toward and from each other, the latter constituting jaws, oppositely-turned prongs on the latter, a box-like guide fast on the longer arm of one member, to slidably receive the similar arm of the other member, and a set-screw on the guide to act upon and clamp the latter from longitudinal movement.

4. In a device of the class described, a straight, elongated jaw-carrier having a lateral jaw at one end and a ring at the other end, a box-like guide fast on said jaw-carrier, a second, longer jaw-carrier longitudinally slidable in the guide and having a lateral jaw in parallelism with the first-named jaw, a thumb-piece at the opposite end of said longer jaw-carrier, and a clamp-screw to prevent relative longitudinal movement of the jaw-carriers and thereby hold the jaws in adjusted position.

In testimony whereof I have signed my name to this specification in the presence of two subscribing witnesses.

JOHN E. HILL.

Witnesses:
  I. G. LUNT,
  J. C. McLEOD.